(12) United States Patent
Klier

(10) Patent No.: US 12,065,111 B1
(45) Date of Patent: Aug. 20, 2024

(54) AIR BRAKES SOUND EFFECTS SYSTEM

(71) Applicant: William F. Klier, Palm Harbor, FL (US)

(72) Inventor: William F. Klier, Palm Harbor, FL (US)

(73) Assignee: Pressure Drop Technology Integration, Inc., Palm Harbor, FL (US)

( * ) Notice: Subject to any disclaimer, the term of this patent is extended or adjusted under 35 U.S.C. 154(b) by 0 days.

(21) Appl. No.: 18/232,147

(22) Filed: Aug. 9, 2023

(51) Int. Cl.
| | |
|---|---|
| *B60Q 5/00* | (2006.01) |
| *B60T 7/06* | (2006.01) |
| *B60T 13/26* | (2006.01) |
| *B60T 15/02* | (2006.01) |

(52) U.S. Cl.
CPC .............. *B60T 13/268* (2013.01); *B60Q 5/00* (2013.01); *B60T 7/06* (2013.01); *B60T 15/027* (2013.01)

(58) Field of Classification Search
CPC ........ B60T 7/06; B60T 13/268; B60T 13/683; B60T 15/027; B60T 17/008; B60Q 5/00
See application file for complete search history.

(56) References Cited

U.S. PATENT DOCUMENTS

| | | | | |
|---|---|---|---|---|
| 1,017,938 A | * | 2/1912 | Williamson .............. | G10K 5/00 116/141 |
| 2,637,293 A | * | 5/1953 | Graham ................... | B60Q 5/00 116/28 R |
| 5,061,015 A | * | 10/1991 | Cramer ................. | B60T 13/263 303/7 |
| 6,312,060 B1 | * | 11/2001 | Lipscomb ............. | B60T 13/683 188/170 |
| 6,752,472 B2 | * | 6/2004 | Bezzina ................ | B60T 13/662 303/7 |
| 11,440,514 B2 | * | 9/2022 | Leinung ................ | B60T 13/385 |
| 2015/0375720 A1 | * | 12/2015 | Leoka ................... | B60T 13/683 303/127 |
| 2019/0152459 A1 | * | 5/2019 | Dieckmann ........... | B60T 13/662 |
| 2021/0370898 A1 | * | 12/2021 | Eckert ................... | B60T 8/1708 |
| 2022/0340111 A1 | * | 10/2022 | Fry ....................... | B60T 8/1708 |

FOREIGN PATENT DOCUMENTS

KR            0138207 Y1 * 4/1999 ............... B60Q 5/00

* cited by examiner

*Primary Examiner* — Thomas J Williams
(74) *Attorney, Agent, or Firm* — Nicholas Pfeifer; Smith & Hopen, P. A.

(57) ABSTRACT

An air brake sound system configured to discharge compressed air to simulate an air brake system on a vehicle that does not employ air brakes. The system includes at least one air receiver tank for housing pressurized gas, at least one discharge tank, and a series of valves for controlling the flow and discharge of pressurized gas during fill events and discharge events. Some embodiments further include an air compressor for refiling the air receiver tank. With a multitude of discharge tanks set adjacent to a vehicle's tires, the system can mimic the sound profile of a vehicle with air brakes.

18 Claims, 7 Drawing Sheets

AIR BRAKES SOUND EFFECTS SYSTEM

BACKGROUND OF THE INVENTION

1. Field of the Invention

This invention relates, generally, to accessories for motor vehicles.

2. Brief Description of the Prior Art

Air brake systems have long been a critical safety component in the transportation industry, ensuring reliable and efficient braking performance for heavy commercial vehicles. However, the existing air brake systems face several challenges such as limited responsiveness, potential for brake fade, and inefficient energy utilization. Yet, air brake systems provide a unique sound characteristic when the compressed air discharges from the system. This sound characteristic is enjoyable to some. Unfortunately, there does not exist a system and method for producing the unique sound characteristic of an air brake system while using conventional non-air-based brake systems.

Accordingly, what is needed is a system for discharging compressed air to simulate air brakes on a vehicle employing an alternative braking system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system for discharging compressed air to simulate air brakes is now met by a new, useful, and nonobvious invention.

The novel structure includes a receiver tank configured to house pressurized gas, an air compressor configured to deliver pressurized gas to the receiver tank, and a discharge tank configured to be filled with pressurized gas from the receiver tank during a fill event and configured to discharge pressurized gas from the discharge tank during a discharge event. Some embodiments include a plurality of discharge tanks configured to be filled with pressurized gas from the receiver tank during the fill event and configured to discharge pressurized gas from the discharge tank during the discharge event.

The system further includes a first control valve configured to control the flow of pressurized gas between the receiver tank and the discharge tank. The first control valve is configured to be moved to a first position during the fill event and to a second position during the discharge event. In some embodiments, the first valve is a normally closed solenoid valve in electrical communication with a power source and a trigger.

The trigger is in operable communication with the first control valve. In addition, the trigger is configured to move the first control valve between the first position and the second position and a user can actuate the trigger to cause a discharge event.

In some embodiments, the trigger is a brake pedal on an existing vehicle when the system is installed on the existing vehicle. The brake pedal triggers the fill event when the brake pedal is pressed and triggers the discharge event when the brake pedal is no longer pressed.

Some embodiments of the system further include a quick exhaust valve in fluidic communication with one or more discharge tanks. The quick exhaust valve(s) are configured to exhaust pressurized gas from the discharge tank(s) during the discharge event.

In some embodiments, the system further includes a normally closed second control valve. The second control valve has a pneumatic pilot port, an inlet port, an outlet port and an exhaust port. The inlet port is configured to receive pressurized gas from the receiver tank when opened, the outlet port is configured to direct pressurized gas from the inlet port when opened to the discharge tank, and the pneumatic pilot port is configured to receive pressurized gas from the first control valve when an inlet port of the first control valve is opened to receive pressurized gas from the receiver tank. The pneumatic pilot port is further configured to open the inlet port of the second control valve when the pneumatic pilot port receives pressurized gas from the first control valve. In addition, the pneumatic pilot port closes the inlet port of the second control valve when the pneumatic pilot port does not receive pressurized gas from the first control valve.

Embodiments may further include a control system. The control system is configured to detect when the receiver tank needs to be refilled and further configured to cause the air compressor to refill the receiver tank.

Some embodiments of the present invention include an air brake sound system kit. The kit includes a receiver tank configured to receive and house pressurized gas, an air compressor configured to deliver pressurized gas to the receiver tank, a plurality of discharge tanks configured to be filled with pressurized gas from the receiver tank during a fill event, and fluid lines connecting the air compressor to the receiver tank and the receiver tank to the plurality of discharge tanks. The kit further includes a quick exhaust valve in fluidic communication with each of the plurality discharge tanks. Each quick exhaust valve is configured to exhaust pressurized gas from the discharge tank during a discharge event.

A first control valve is also included in the kit. The first control valve is configured to control the flow of pressurized gas between the receiver tank and the plurality of discharge tanks. Moreover, the first control valve is configured to be moved to a first position during the fill event and to a second position during the discharge event. In some embodiments, the first valve is a normally closed solenoid valve in electrical communication with a power source.

The kit also includes a connector configured to electrically connect to the first control valve and a component on a vehicle, such that manipulation of the component on the vehicle sends an electrical signal to the controller to move the first control valve between the first and second positions. In some embodiments, the connector is configured to electrically connect to a braking system on the vehicle.

The kit also includes a control system in some embodiments. The control system is configured to detect when the receiver tank needs to be refilled and cause the air compressor to refill the receiver tank.

Some embodiments of the kit further include a normally closed second control valve. The second control valve has a pneumatic pilot port, an inlet port, an outlet port and an exhaust port. The inlet port is configured to receive pressurized gas from the receiver tank when opened, the outlet port is configured to direct pressurized gas from the inlet port when opened to the discharge tank, and the pneumatic pilot port is configured to receive pressurized gas from the first control valve when an inlet port of the first control valve is opened to receive pressurized gas from the receiver tank. The pneumatic pilot port is further configured to open the inlet port of the second control valve when the pneumatic pilot port receives pressurized gas from the first control valve. In addition, the pneumatic pilot port closes the inlet port of the second control valve when the pneumatic pilot port does not receive pressurized gas from the first control valve.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention includes a system and method for discharging compressed air to simulate an air brake system on a vehicle that does not employ air brakes. The system, referred to as an "air brake sound system," includes at least one air tank for housing pressurized gas, a series of valves for filling and discharging discharge tank(s), and a control system configured to control the filling and discharging.

Figure 1:
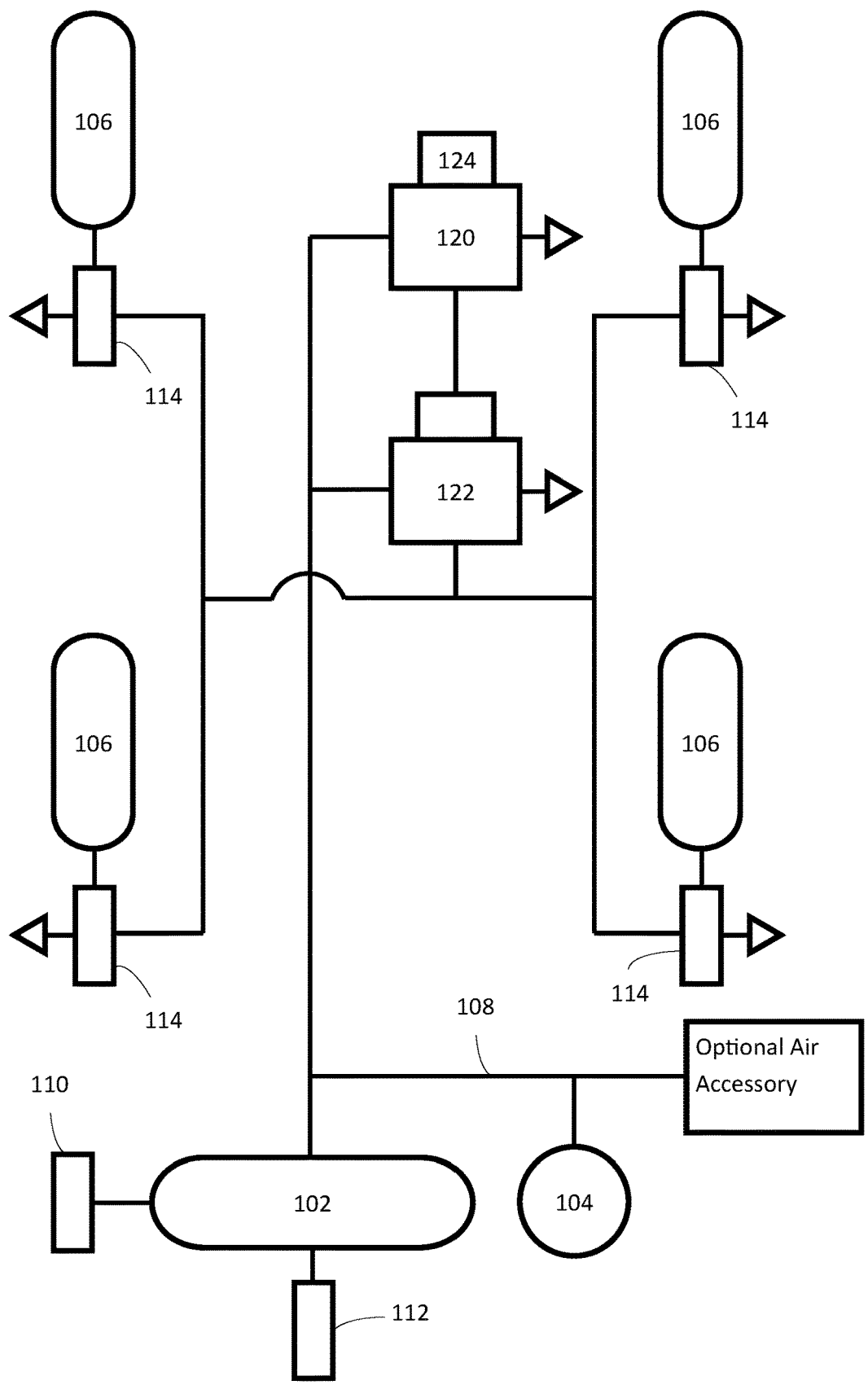
FIG. 1 is a schematic diagram of an embodiment of the present invention.

FIG. 1 depicts an exemplary embodiment of a pneumatic circuit of air brake sound system 100. The system includes primary air receiver tank 102. Receiver tank 102 is configured to receive and house pressurized gas for future use with air brake sound system 100. Receiver tank 102 includes a capacity sufficient to house enough pressurized gas to fill the one or more discharge tanks 106 used in air brake sound system 100. In some embodiments, primary air receiver tank 102 is configured to house a volume of at least 2 gallons of gas at a pressure of at least 120 PSI.

Primary air receiver tank 102 may be prefilled or may be fluidly connected to an air compressor 104 to allow for refilling at any time. Air compressor 104 may be provided with air brake sound system 100 as part of a kit or may be a pre-existing compressor, such as those used for air horns or other accessories. To allow for fluidic exchange, one or more fluid lines 108 extends from an outlet in air compressor 104 to an inlet in primary air receiver tank 102. Some embodiments may include intermediate valves to control the flow rate and flow direction of fluid between air compressor 104 and primary air receiver tank 102.

In some embodiments, receiver tank 102 is configured to house gases other than air. For example, receiver tank 102 can be a nitrous oxide tank. The nitrous oxide tank may be a pre-existing tank used to perform some alternative task(s), e.g., delivering nitrous oxide to the engine. The same nitrous oxide tank can be used as the receiver tank 102 by using an additional valve to regulate the flow of gas into the engine and into air brake sound system 100.

Air compressor 104 can be controlled by a user with a switch or can be controlled through an automatic refill system. Regardless of the refilling approach, receiver tank 102 includes a pressure gauge to measure the pressure of receiver tank 102. The pressure may be displayed to a user (e.g., the driver of the vehicle) or may simply be used to actuate the automatic refill system. More specifically, when the pressure drops to a predetermined value, the automatic refill system is configured to send a signal to air compressor 104 to begin refilling receiver tank 102. Similarly, when the pressure in receiver tank 102 reaches a predetermined upper threshold, the automatic refill system is configured to send a signal to air compressor 104 to stop pressurizing receiver tank 102.

Some embodiments of air brake sound system 100 further include an ASME safety release valve 110 in fluid connection with receiver tank 102. Safety valve 110 may be any safety valve known in the art for controlling the pressure in a pressurized system. Likewise, safety valve 110 may include any of the common components used to control the pressure in a pressurized system.

Some embodiments of air brake sound system 100 also include drain valve 112 to release moisture that can build up in pressure tanks. Drain valve 112 is in fluid connection with receiver tank 102 and is configured to discharge moisture from receiver tank 102. In some embodiments, drain valve 112 includes a manually operated controller to drain receiver tank 102. Some embodiments, additionally or alternatively, include a timer and circuitry in operable communication with drain valve 112 to automatically drain moisture from receiver tank 102 for a specific amount of time.

Air brake sound system 100 further includes one or more discharge tanks 106 in fluidic communication with receiver tank 102 via one or more fluid lines 108 extending from receiver tank 102 to the one or more discharge tanks 106. Some embodiments may include intermediate valves to control the flow rate and flow direction of fluid between primary air receiver tank 102 and the one or more discharge tanks 106.

In some embodiments, air brake sound system 100 includes one discharge tank 106. In some embodiments, air brake sound system 100 includes a front and a back discharge tank 106 intended to reside near the front wheels and near the back wheel of a vehicle, respectively. In some embodiments, air brake sound system 100 includes four discharge tanks 106 (as shown in FIG. 1) with each intended to reside adjacent to one of the four wheels of a vehicle. In addition, discharge tanks are configured to be secured to a vehicle using any known methods and devices.

Air brake sound system 100 is configured such that receiver tank 102 can deliver pressurized fluid to discharge tanks 106 during a fill event and discharge tanks 106 can retain the pressurized fluid until a discharge event is triggered to produce a synthetic air brake sound. Discharge tanks 106 are configured to house around 1 pint or more of gas at a pressure of at least 100 PSI to produce a similar sounding discharge in comparison to an air brake system.

Each discharge tank 106 can be of a standard pressure tank design and/or can be comprised of less expensive materials capable of withstanding the necessary pressure to produce a discharge sound similar to that of a typical air brakes system. As a non-limiting example, discharge tanks could be comprised of simple PVC pipes, with one end capped and the other end in operable fluid communication with exhaust valve 114.

Figure 2A:
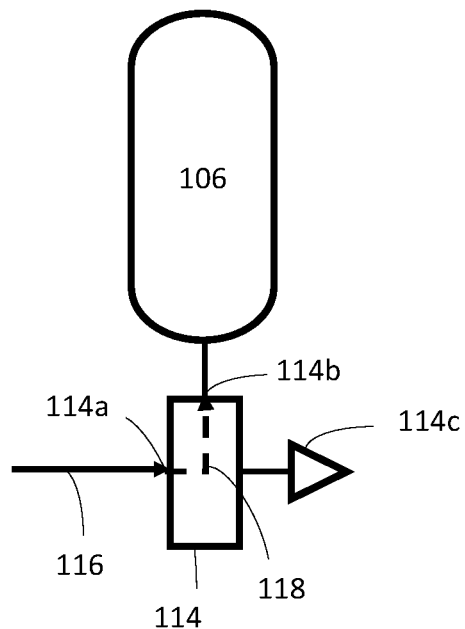
FIG. 2A is a schematic diagram of an embodiment of the exhaust valve and discharge tank during a fill event.
Figure 2B:
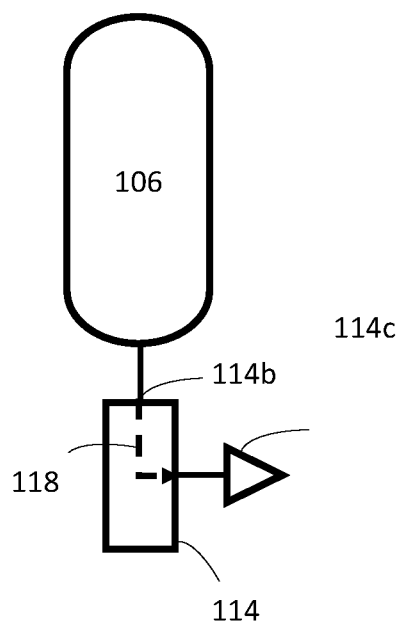
FIG. 2B is a schematic diagram of an embodiment of the exhaust valve and discharge tank during a discharge event.

As best depicted in FIG. 2, each discharge tank includes exhaust valve 114. In some embodiments, exhaust valve 114 is a quick exhaust valve. Each quick exhaust valve 114 includes inlet port 114*a*, outlet port 114*b*, and exhaust port 114*c*. During a fill event, shown in FIG. 2A, pressurized gas is delivered via fluid lines 108 from receiver tank 102, through any intermediate valves, and into inlet port 114*a* as represented by arrow 116. The pressurized gas is directed through quick exhaust valve 114, exits valve 114 through outlet port 114*b*, and enters the corresponding discharge tank 106. During a discharge event, shown in FIG. 2B, pressurized gas is no longer being delivered to exhaust valve 114 through inlet port 114*a*. As a result, the pressurized gas stored in discharge tank 106 forces the internal components of exhaust valve 114 into an exhaust position thereby opening a flow path, as represented by arrow 118, between outlet port 114*b* and exhaust port 114*c*. The pressurized gas stored in discharge tank 106 discharges to the environment and creates a sound that replicates the sound air brakes make when venting pressurized air.

As provided in the explanation of exhaust valves 114 above, the internal components of these valves are configured to transition between a fill position (FIG. 2A) and an exhaust position (FIG. 2B). While the exemplary embodiment described is a pressure driven exhaust valve, alternative valves known in the art can be used. In addition, one or more control systems known in the art can be used to control the position of these alternative valves to move between the fill and exhaust positions.

Air brake sound system 100 further includes one or more valves in operable communication with receiver tank 102 and discharge tanks 106 to control the flow of gas between receiver tank 102 and the one or more discharge tanks 106. As shown in FIG. 1, some embodiments include first control valve 120. First control valve 120 includes inlet port 120*a* and outlet port 120*b*. Some embodiments also include exhaust port 120*c*. First control valve 120 further includes internal components configured to open and close the flow path through the ports 120*a*, 120*b*, and 120*c*.

Figure 3A:
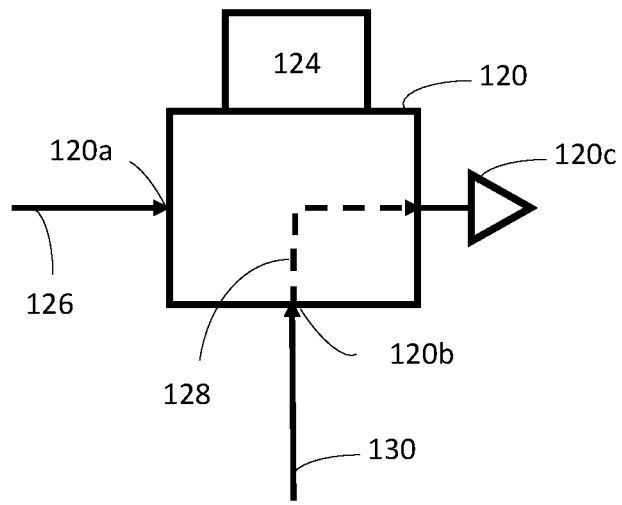
FIG. 3A is a schematic diagram of an embodiment of the first control valve during a non-event or during a discharge event.

In some embodiments, first control valve 120 is a solenoid valve and can be a "normally closed" valve meaning that inlet port 120*a* is closed in a normal, unaltered state, which is depicted in FIG. 3A. As provided therein, any pressurized gas, represented by arrow 126, is blocked by closed inlet port 120*a*. However, the flow path, as represented by arrow 128, allows any pressurized gas, as represented by arrow 130, to enter first control valve 120 through outlet port 120*b* and exit through exhaust port 120*c*.

In some embodiments, first control valve 120 includes controller 124 for controlling the position of the solenoid in first control valve 120 and in turn the flow path through first control valve 120. Controller 124 may be configured to provide an electrical current or an electromagnetic force to move the solenoid within first control valve 120 from its normal closed inlet position (exemplified in FIG. 3A) to an open inlet position (exemplified in FIG. 3B).

Figure 3B:
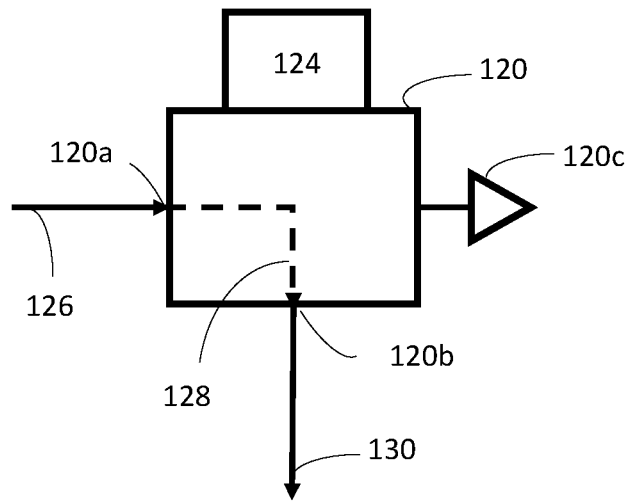
FIG. 3B is a schematic diagram of an embodiment of the first control valve during a fill event.

As shown in FIG. 3B, when inlet port 120*a* is open, the pressurized gas from air receiver tank 102, as represented by arrow 126, can enter valve 120 and exit outlet port 120*b* through the flow path represented by arrow 128. The pressurized gas from air receiver tank 102 will then proceed to the subsequent valves in air brake sound system 100 as represented by arrow 130.

While the exemplary depicted first control valve 120 is a normally closed solenoid valve, some embodiment of air brake sound system 100 may use an alternative valve design known in the art for first control valve 120. In addition, alternative control systems known in the art, including but not limited to pneumatic, mechanical, manual, and electrical mechanisms, can be used to control the flow path of these alternative first control valves.

Referring back to FIG. 1, some embodiments of air brake sound system 100 include second control valve 122. Second control valve 122 includes inlet port 122a and outlet port 122b. Some embodiments also include exhaust port 122c and pneumatic pilot port 122d. Second control valve 122 further includes internal components configured to open and close the flow path through the ports 122a, 122b, 122c, and 122d.

Figure 4A:
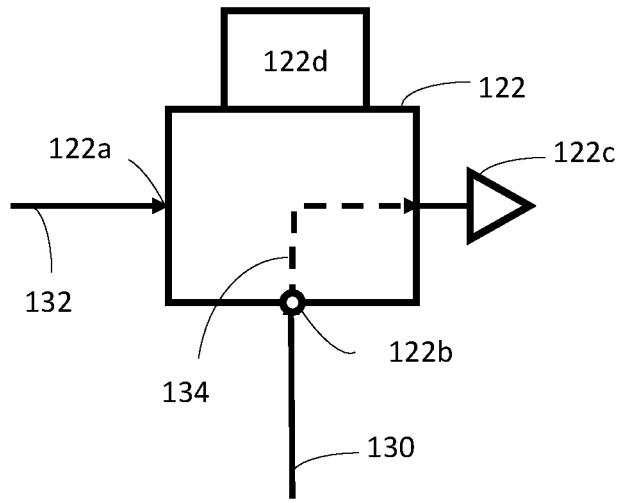
FIG. 4A is a schematic diagram of an embodiment of the second control valve during a non-event or during a discharge event.

In some embodiments, second valve 122 is a normally closed, pneumatic pilot, two position, 3-way valve. Like first control valve 120, inlet port 122a is closed in a normal, unaltered state, which is depicted in FIG. 4A. As provided therein, any pressurized gas, represented by arrow 132, is blocked by closed inlet port 122a. However, the flow path, as represented by arrow 134, allows any pressurized gas, as represented by arrow 136, to enter second control valve 122 through outlet port 122b and exit through exhaust port 122c.

Figure 4B:
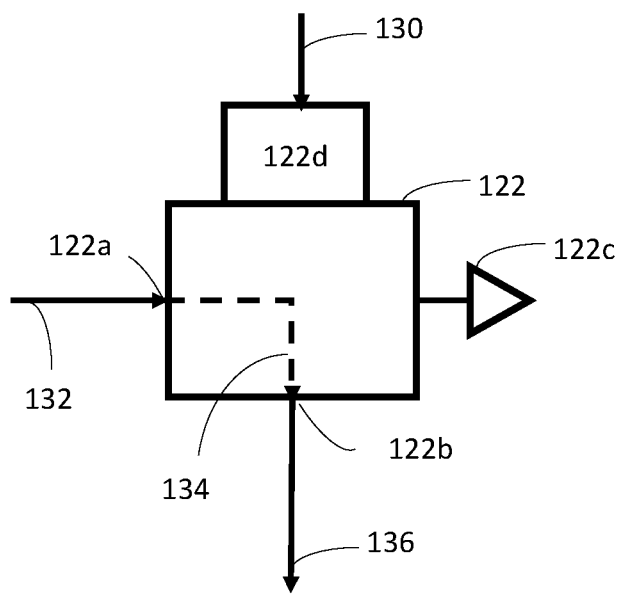
FIG. 4B is a schematic diagram of an embodiment of the second control valve during a fill event.

In some embodiments, second control valve 122 includes pneumatic pilot port 122d configured to control the flow path within second control valve 122. For example, normally closed inlet port 122a is forced into an open position (exemplified in FIG. 4B) when pressurized air passes through pneumatic pilot port 122d. As shown in FIG. 4B, when pneumatic pilot port 122d receives the pressurized gas, as represented by arrow 130, from first control valve 120, inlet port 122a is opened. When inlet port 122a is open, the pressurized gas from air receiver tank 102, as represented by arrow 132, can enter valve 122 and exit outlet port 122b through the flow path represented by arrow 134. The pressurized gas from air receiver tank 102 will then proceed to the subsequent valves and/or tanks in air brake sound system 100 as represented by arrow 136.

While the exemplary depicted second control valve 122 is a normally closed, pneumatic pilot, two position, 3-way valve, some embodiment of air brake sound system 100 may use alternative valve designs known in the art for second control valve 122. In addition, alternative control systems known in the art, including but not limited to pneumatic, mechanical, manual, and electrical mechanisms, can be used to control the flow path of these alternative second control valves.

Figure 5:
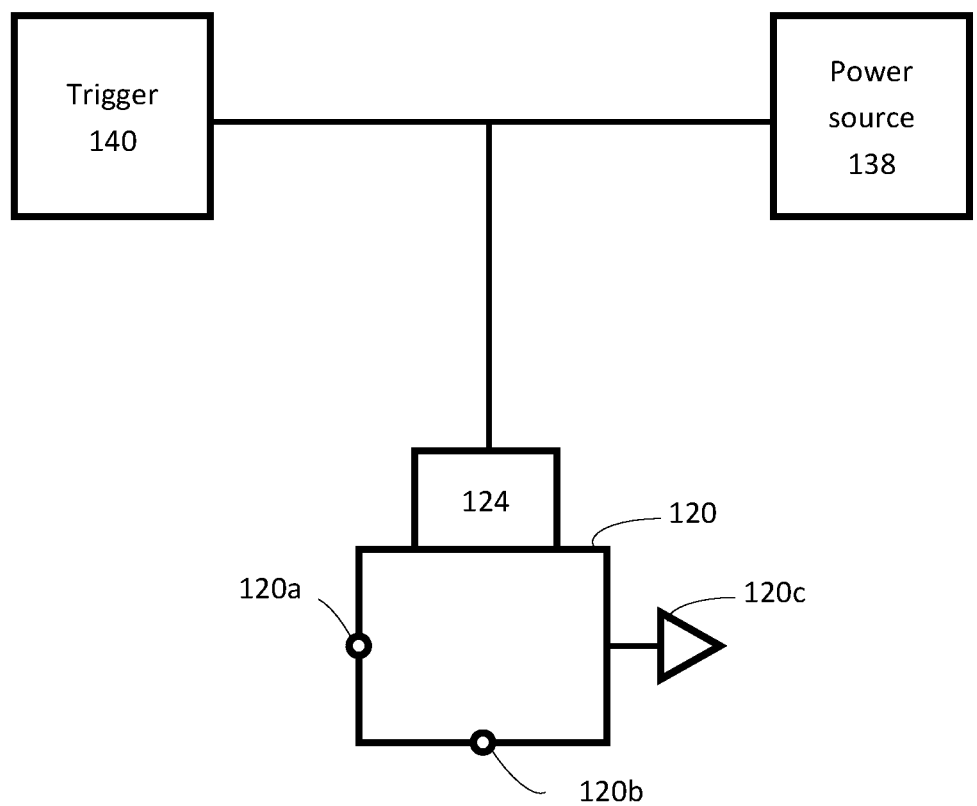
FIG. 5 is a schematic diagram of an embodiment of the controller in communication with a trigger and a power source.

Referring now to FIG. 5, embodiments that include a solenoid valve or any other electrically controlled first control valve 122 (or any other electrically controlled valves) further include power source 138 and at least one trigger 140. Power source 138 may be an independent power source or may plug into the existing power in the vehicle. Power source 138 may power other control systems and air compressor 104.

Trigger 140 may be in the form of an existing component on a vehicle (e.g., the vehicle's brake pedal, hand brake, etc.) or may be in the form of an external add-on trigger (e.g., a lever, button, etc.). Trigger 140 is configured to control first control valve 122. As exemplified in FIG. 5, trigger 140 is in electrical communication with first control valve 122. However, trigger 140 may be in electrical, mechanical, or pneumatic communication with first control valve 122 or any other valves in air brake sound system 100.

Regardless of the method of communication between trigger 140 and first control valve 120, trigger 140 is configured to move first control valve 120 between the open and closed position to control the flow of pressurized gas from air receiver tank 102 to discharge tanks 106. In some embodiments, trigger 140 may be in communication with and control other valves in air brake sound system 100.

Figure 6:
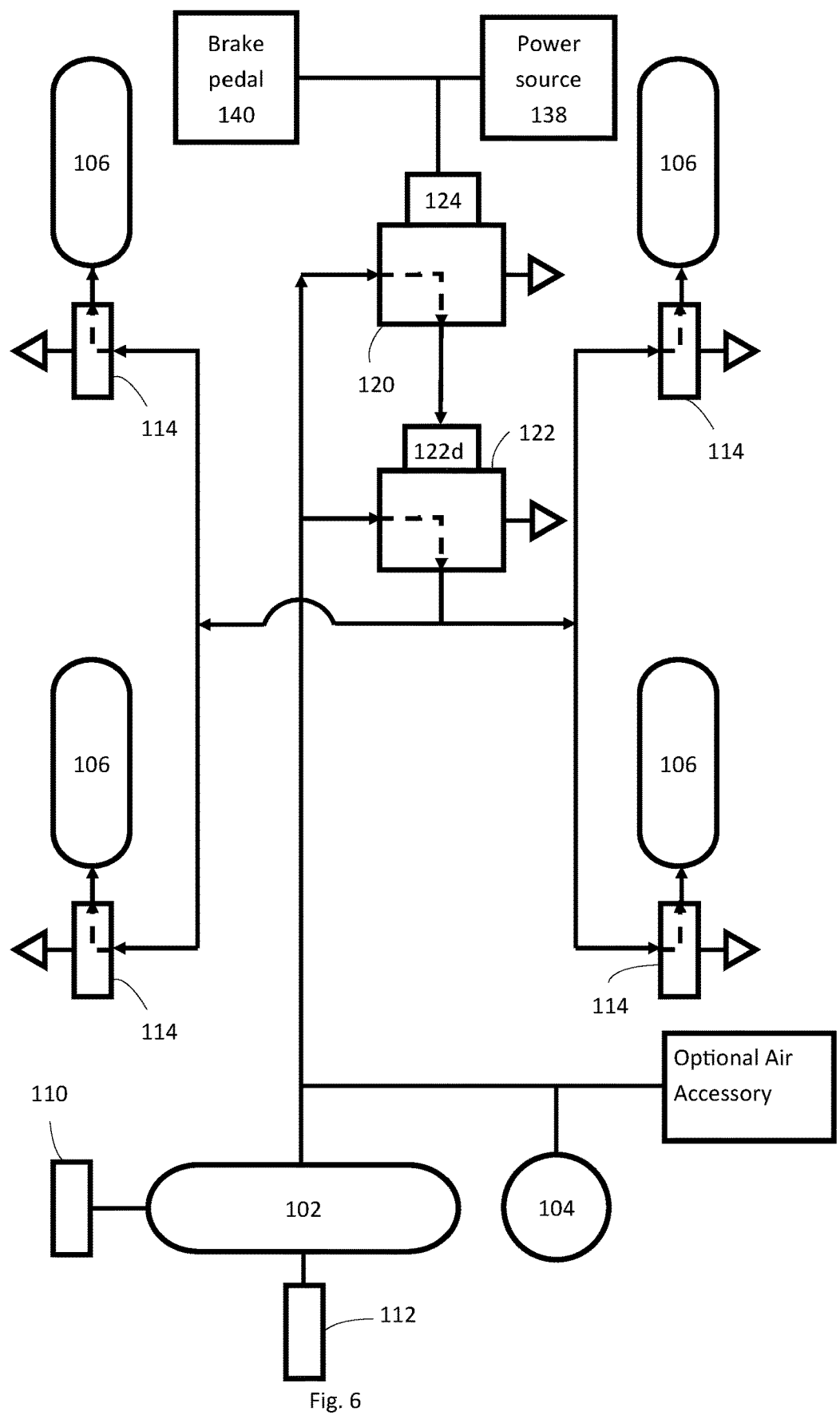
FIG. 6 is a schematic diagram of an embodiment of the present invention during a fill event.

FIG. 6 provides an example of the fill event caused by operation of trigger 140 when trigger 140 is in the form of the vehicle's brake pedal, first control valve 120 is a solenoid valve, and second control valve 122 is a pneumatically controlled 3-way valve. A user triggers the air brake sound system 100 by pressing brake pedal 140. Brake pedal 140 sends an electrical signal to controller 124, which produces a current to move the solenoid in first control valve 120 from a normally closed position to an open position. As a result, pressurized gas from receiver tank 102 flows through first control valve 120 and enters pneumatic pilot port 122d in second control valve 122. The pressurized gas entering pneumatic pilot port 122d forces the internal components of second control valve 122 into an open position so that pressurized gas from air receiver tank 102 can flow through second control valve 122. The pressurized gas passing through second control valve 122 is directed into exhaust valves 114 and into discharge tanks 106. This process is referred to as a fill event.

The fill event in some embodiments is initiated by actuation of brake pedal 140. In some embodiments, the fill event ceases when brake pedal 140 is released. As such, air receiver tank 102 has a sufficient capacity to ensure that pressurized gas continues to flow through first control valve 120 and second control valve 122 to completely fill discharge tanks 106. In some embodiments, the fill event ceases when discharge tanks 106 reach a predetermined pressure (which can be controlled by a valve and pressure gauge) and/or when the volume or pressure in air receiver tank is reduced to a predetermined pressure (which can be controlled by a valve and pressure gauge).

In some embodiments, trigger 140 also causes the discharge event through a second actuation or movement of trigger 140 to a second position. For example, when trigger 140 is a brake pedal, the first position that causes the fill event includes compressing the brake pedal while the second position that causes the discharge event includes releasing the brake pedal. In some embodiments, trigger 140 is configured to cause the fill event when the trigger is in a first position or operation and a discharge event when the trigger is in a second position or operation. In some embodiments, trigger 140 causes the fill event while a secondary trigger causes the discharge event. Like trigger 140, the secondary trigger may be in the form of an existing component on a vehicle (e.g., the vehicle's brake pedal, hand brake, etc.) or may be in the form of an external add-on trigger (e.g., a lever, button, etc.). In addition, the secondary trigger is configured to control first control valve 120 through electrical, mechanical, and/or pneumatic communication with first control valve 120 or any other valves in air brake sound system 100.

In some embodiments, controller 124 is tied into an electrical component in the vehicle, so that trigger 140 produces an electrical signal that can be interpreted by controller 124. For example, in some embodiments controller 124 is tied into the brake light(s) of the vehicle. When the brake light(s) are turned "ON," an electrical signal is sent to controller 124 to open inlet port 120a to cause a fill event. When the brake light(s) are turned "OFF," an electrical signal is sent to controller 124 to close inlet port 120a to cause a discharge event.

Figure 7:
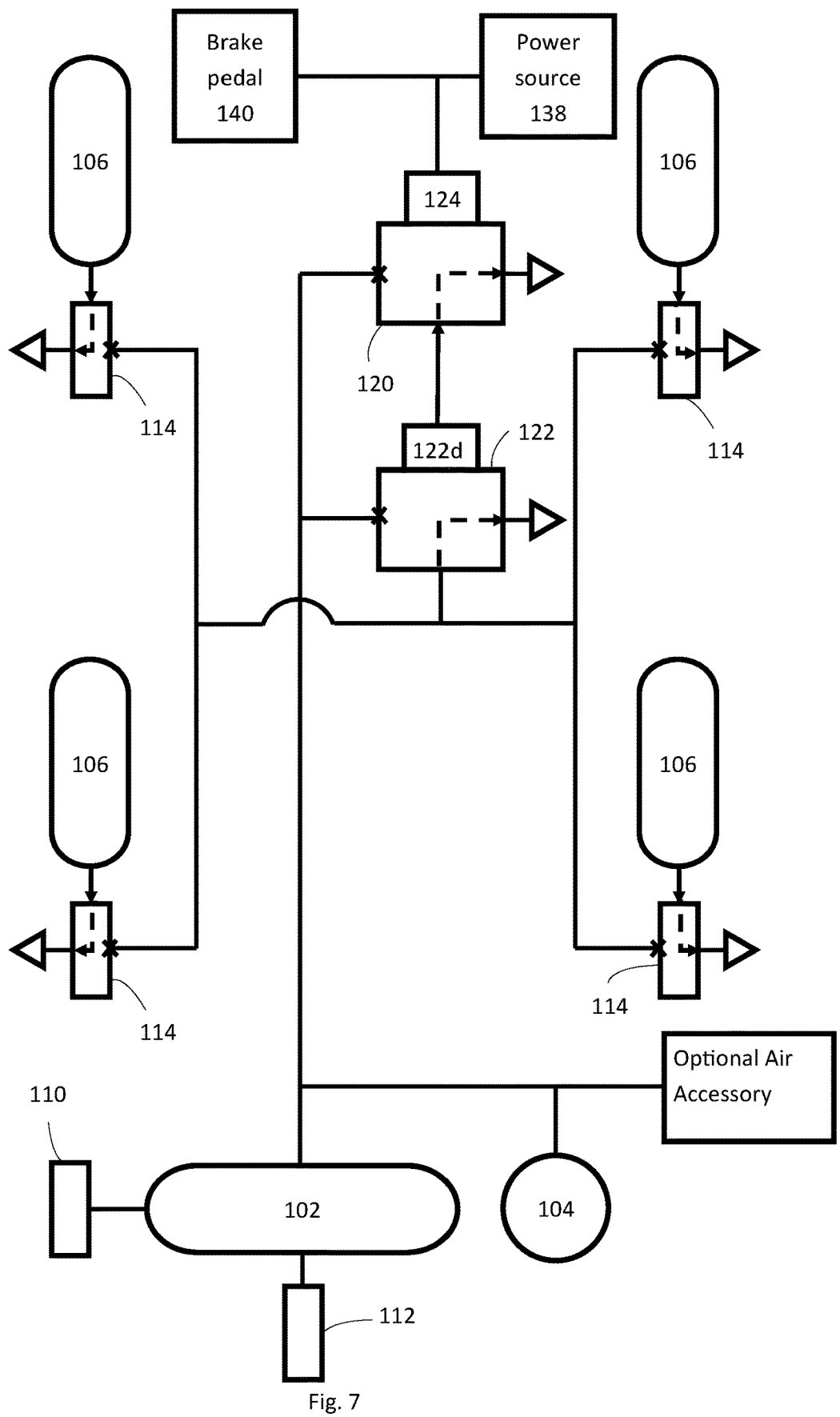
FIG. 7 is a schematic diagram of an embodiment of the present invention during a discharge event.

FIG. 7 provides an example of the discharge event caused by the release of brake pedal 140 (i.e., trigger 140) when first control valve 120 is a solenoid valve and second control valve 122 is a pneumatically controlled 3-way valve. Upon releasing brake pedal 140, an electrical signal is sent to controller 124 to move the solenoid to close inlet port 120a. Closing inlet port 120a cuts off the flow of pressurized gas through first control valve 120 and causes a pressure drop at pneumatic pilot port 122d. The drop in pressure moves the internal components in second control valve 122 to close inlet port 122a, which cuts off the flow of pressurized gas through second control valve 122 and causes a pressure drop at inlet ports 114a of each exhaust valve 114. The drop in pressure at inlet ports 114a moves the internal components in each exhaust valve 114 and opens the flow path between outlet port 114b and exhaust port 114c. The pressurized gas in discharge tanks 106 is quickly discharged through exhaust ports 114c. The result is a sound profile that mimics the discharge of air from an air brake system.

Embodiments may include additional valves throughout the system to control the flow of pressurized gas to the different components described in the various embodiments of air brakes sound system 100. Nonlimiting examples include valves leading into and out of air receiver tank 102, valves between air receiver tank 102 and compressor 104, and/or valves between air receiver tank 102 and/or compressor 104 and the optional or preexisting air accessories on the vehicle.

It should be noted that while the figures depict lines and arrows between components, the lines and arrow also represent the fluidic lines extending between the components to allow for the exchange of pressurized gas between said components.

It should also be noted that the controller and control systems described herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A sound system for a vehicle for simulating an air brake, comprising:
    a receiver tank configured to house pressurized gas, the receiver tank including an inlet port and an outlet port;
    an air compressor configured to deliver pressurized gas to the receiver tank through the inlet port;
    a discharge tank, the discharge tank having an inlet port and an outlet port, wherein the discharge tank is configured to be filled with pressurized gas from the receiver tank during a fill event and configured to discharge pressurized gas from the discharge tank during a discharge event;
    a first control valve residing between the outlet port of the receiver tank and the inlet port of the discharge tank, wherein the first control valve is configured to control the flow of pressurized gas between the receiver tank and the discharge tank by moving between a first position during the fill event and to a second position during the discharge event;
    a trigger in operable communication with the first control valve, wherein the trigger is configured to move the first control valve between the first position and the second position and a user can actuate the trigger to cause a discharge event;
    whereby the air brake sound system is configured to produce the discharge event to release pressurized gas from the discharge tank.

2. The sound system of claim 1, further including a plurality of discharge tanks configured to be filled with pressurized gas from the receiver tank during the fill event and configured to discharge pressurized gas from the discharge tank during the discharge event.

3. The sound system of claim 1, further including a quick exhaust valve in fluidic communication with the discharge tank and configured to exhaust pressurized gas from the discharge tank during the discharge event.

4. The sound system of claim 1, wherein the trigger is a brake pedal on the vehicle when the system is installed on the vehicle.

5. The sound system of claim 4, wherein the brake pedal triggers the fill event when the brake pedal is pressed and triggers the discharge event when the brake pedal is no longer pressed.

6. The sound system of claim 1, further including a control system configured to detect when the receiver tank needs to be refilled and cause the air compressor to refill the receiver tank.

7. The sound system of claim 1, wherein the first valve is a normally closed solenoid valve in electrical communication with a power source and the trigger.

8. The sound system of claim 1, further including;
    a normally closed second control valve, the second control valve having a pneumatic pilot port, an inlet port, an outlet port and an exhaust port;
    the inlet port configured to receive pressurized gas from the receiver tank when opened;
    the outlet port configured to direct pressurized gas from the inlet port when opened to the discharge tank;
    the pneumatic pilot port configured to receive pressurized gas from the first control valve when an inlet port of the first control valve is opened to receive pressurized gas from the receiver tank; and
    the pneumatic pilot port configured to open the inlet port of the second control valve when the pneumatic pilot port receives pressurized gas from the first control valve and close the inlet port of the second control valve when the pneumatic pilot port does not receive pressurized gas from the first control valve.

9. A sound producing system for a vehicle for simulating an air brake, comprising:
    a receiver tank configured to receive and house pressurized gas;
    an air compressor configured to deliver pressurized gas to the receiver tank;

a plurality of discharge tanks configured to be filled with pressurized gas from the receiver tank during a fill event;

a quick exhaust valve in fluidic communication with each of the plurality of discharge tanks, each quick exhaust valve configured to exhaust pressurized gas from the discharge tank during a discharge event;

a first control valve configured to control the flow of pressurized gas between the receiver tank and the plurality of discharge tanks, wherein the first control valve is configured to be moved to a first position during the fill event and to a second position during the discharge event;

a trigger in operable communication with the first control valve, wherein the trigger is configured to move the first control valve between the first position and the second position and a user can actuate the trigger to cause a discharge event;

whereby the air brake sound system is configured to produce the discharge event to release pressurized gas from the plurality of discharge tanks.

10. The sound system of claim 9, wherein the trigger is a brake pedal on an existing vehicle when the system is installed on the existing vehicle.

11. The sound system of claim 10, wherein the brake pedal triggers the fill event when the brake pedal is pressed and triggers the discharge event when the brake pedal is no longer pressed.

12. The sound system of claim 9, further including a control system configured to detect when the receiver tank needs to be refilled and cause the air compressor to refill the receiver tank.

13. The sound system of claim 9, wherein the first valve is a normally closed solenoid valve in electrical communication with a power source and the trigger.

14. The sound system of claim 9, further including;

a normally closed second control valve, the second control valve having a pneumatic pilot port, an inlet port, an outlet port and an exhaust port;

the inlet port configured to receive pressurized gas from the receiver tank when opened;

the outlet port configured to direct pressurized gas to the plurality of discharge tanks from the inlet port when the inlet port is opened;

the pneumatic pilot port configured to receive pressurized gas from the first control valve when an inlet port of the first control valve is opened to receive pressurized gas from the receiver tank; and the pneumatic pilot port configured to open the outlet port of the second control valve when the pneumatic pilot port receives pressurized gas from the first control valve and close the inlet port of the second control valve when the pneumatic pilot port does not receive pressurized gas from the first control valve.

15. A sound producing system for a vehicle for simulating an air brake, comprising:

a receiver tank configured to receive and house pressurized gas;

an air compressor configured to deliver pressurized gas to the receiver tank;

a plurality of discharge tanks configured to be filled with pressurized gas from the receiver tank during a fill event;

fluid lines connecting the air compressor to the receiver tank and the receiver tank to the plurality of discharge tanks;

a quick exhaust valve in fluidic communication with each of the plurality discharge tanks, each quick exhaust valve configured to exhaust pressurized gas from the discharge tank during a discharge event;

a first control valve configured to control the flow of pressurized gas between the receiver tank and the plurality of discharge tanks, wherein the first control valve is configured to be moved to a first position during the fill event and to a second position during the discharge event;

a connector configured to electrically connect to the first control valve and a component on the vehicle, such that manipulation of the component on the vehicle sends a signal to a controller to move the first control valve between the first and second positions;

whereby the air brake sound system is configured to produce the discharge event to release pressurized gas from the discharge tank.

16. The sound system of claim 15, further including a control system configured to detect when the receiver tank needs to be refilled and cause the air compressor to refill the receiver tank.

17. The sound system of claim 15, wherein the first valve is a normally closed mechanical or solenoid valve in electrical communication with a power source.

18. The sound system of claim 15, further including;

a normally closed second control valve, the second control valve having a pneumatic pilot port, an inlet port, an outlet port and an exhaust port;

the inlet port configured to receive pressurized gas from the receiver tank;

the outlet port configured to direct pressurized gas to the plurality of discharge tanks when the inlet port is opened;

the pneumatic pilot port configured to receive pressurized gas from the first control valve when an outlet port of the first control valve is opened to receive pressurized gas from the receiver tank; and the pneumatic pilot port configured to open the outlet port of the second control valve when the pneumatic pilot port receives pressurized gas from the first control valve and close the inlet port of the second control valve when the pneumatic pilot port does not receive pressurized gas from the first control valve.

* * * * *